(12) United States Patent
Zhang et al.

(10) Patent No.: US 12,229,159 B2
(45) Date of Patent: Feb. 18, 2025

(54) MERKLE PROOF ENTITY

(71) Applicant: nChain Licensing AG, Zug (CH)

(72) Inventors: Wei Zhang, London (GB); Bassem Ammar, London (GB); Jack Owen Davies, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 18/034,028

(22) PCT Filed: Oct. 12, 2021

(86) PCT No.: PCT/EP2021/078213
§ 371 (c)(1),
(2) Date: Apr. 26, 2023

(87) PCT Pub. No.: WO2022/100946
PCT Pub. Date: May 19, 2022

(65) Prior Publication Data
US 2023/0394063 A1     Dec. 7, 2023

(30) Foreign Application Priority Data
Nov. 10, 2020   (GB) ..................................... 2017731

(51) Int. Cl.
*G06F 16/20*   (2019.01)
*G06F 16/22*   (2019.01)
*G06F 16/27*   (2019.01)

(52) U.S. Cl.
CPC .......... *G06F 16/27* (2019.01); *G06F 16/2272* (2019.01)

(58) Field of Classification Search
CPC ...... G06F 16/27; G06F 16/2272; G06F 21/62; G06F 21/602; H04L 9/50; H04L 9/3239; H04L 9/3247

(Continued)

(56) References Cited

U.S. PATENT DOCUMENTS

| | | | | |
|---|---|---|---|---|
| 2018/0025166 A1* | 1/2018 | Daniel | ................. | G06F 9/5011 713/189 |
| 2019/0199516 A1* | 6/2019 | Carver | ................. | H04L 9/3297 |

(Continued)

FOREIGN PATENT DOCUMENTS

WO     2020165676     8/2020

OTHER PUBLICATIONS

PCT/EP2021/078213 International Search Report and Written Opinion dated Dec. 23, 2021, 13 pages.

(Continued)

*Primary Examiner* — Vincent F Boccio
(74) *Attorney, Agent, or Firm* — Messner Reeves LLP

(57) ABSTRACT

A computer-implemented method of providing proof that a data item of a blockchain transaction exists on a blockchain, wherein the method comprises: obtaining, from a requesting party, target data item of a target blockchain transaction; obtaining the target blockchain transaction; obtaining a target Merkle proof for the target blockchain transaction, wherein a corresponding target Merkle root is contained within a block of the blockchain, and wherein obtaining the target Merkle proof comprises calculating an index of a target transaction identifier of the target blockchain transaction within a leaf layer of a corresponding target Merkle tree; and outputting at least the target Merkle proof for use by the requesting party as proof that the target data item exists as part of the target blockchain transaction on the blockchain.

20 Claims, 10 Drawing Sheets

(58) Field of Classification Search
USPC .......................................................... 707/796
See application file for complete search history.

(56) References Cited

U.S. PATENT DOCUMENTS

| | | | |
|---|---|---|---|
| 2021/0109917 A1* | 4/2021 | Xiao | G06F 16/2255 |
| 2022/0108404 A1* | 4/2022 | Bawa | G06Q 40/12 |

OTHER PUBLICATIONS

Alin Tomescu et al: "Catena: Preventing Lies with Bitcoin", IACR, International Association for Cryptologic Research, vol. 20161115:150307, Nov. 13, 2016 (Nov. 13, 2016), pp. 1-17, XP061022070, the whole document.

GB2017731.7 Combined Search Report and Abbreviated Examination Report dated Apr. 1, 2021, 6 pages.

Merkle, Ralph Charles, "Secrecy, Authentication and Public Key Systems", Information Systems Laboratory, Stanford Electronics Laboratories Department of Electrical Engineering, Technical Report No. 1979-1, Jun. 1979, 193 pages, Stanford University, Stanford, California, http://www.merkle.com/papers/Thesis1979.pdf, Accessed Aug. 20, 2020.

WeatherSV, accessed Aug. 20, 2020, https://weathersv.app/find.

BSV Explorer, accessed Aug. 20, 2020, https://whatsonchain.com/.

Hearn, Mike et al., "Connection Bloom filtering", https://github.com/bitcoin/bips/wiki/Comments:BIP-0037, Oct. 24, 2012, accessed Aug. 20, 2020.

PCT/EP2021/078206 International Search Report and Written Opinion dated Dec. 23, 2021, 13 pages.

GB2017729.1 Combined Search Report and Abbreviated Examination Report dated Mar. 31, 2021, 5 pages.

\* cited by examiner

Figure 5
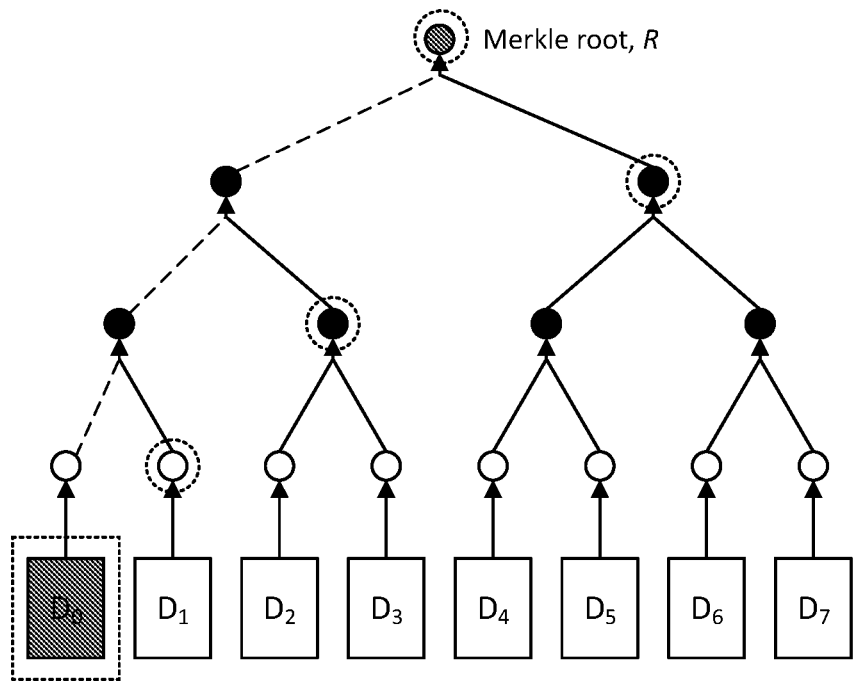
Merkle path:
- - - → Path direction
 Required data
 Given data

MERKLE PROOF ENTITY

TECHNICAL FIELD

The present disclosure relates to methods of providing and obtaining proof that a data of a blockchain transaction exists on a blockchain, or put another way, that a blockchain transaction containing that data exists on the blockchain.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicised. The blockchain comprises a chain of blocks of data, wherein each block comprises one or more transactions. Each transaction, other than so-called "coinbase transactions", points back to a preceding transaction in a sequence which may span one or more blocks going back to one or more coinbase transactions. Coinbase transactions are discussed further below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at some nodes, and the publication of blocks can be achieved through the publication of mere block headers.

The transactions in the blockchain may be used for one or more of the following purposes: to convey a digital asset (i.e. a number of digital tokens), to order a set of entries in a virtualised ledger or registry, to receive and process timestamp entries, and/or to time-order index pointers. A blockchain can also be exploited in order to layer additional functionality on top of the blockchain. For example blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in more detail later. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

SUMMARY

Merkle proofs are commonly used to verify the existence of transactions on the blockchain. A party (e.g. a user) wanting to verify that a particular transaction exists on the blockchain can seek a Merkle proof from a blockchain node. If, using the received Merkle proof, the transaction can be traced to a value matching a Merkle root included in a block of the blockchain, the user can be confident that the transaction exists on the blockchain. Note that additional checks may be required for absolute certainty.

Currently the only entities that provide Merkle proofs are blockchain nodes (a.k.a. miners). As mentioned above, blockchain nodes are primarily concerned with transaction validation, and block construction and publication.

The use of blockchain technology is ever increasing and as such blockchain systems need to be able to scale in order to match the increased usage and demand. One approach to scaling blockchain systems is to expand the size of the blocks, the rate of transactions, and to use the blockchain technology as an immutable ledger for various data applications. This will dramatically increase the size of the blockchain, and the amount of processing spent on transaction validation. Therefore resources for storing the full blockchain, validating transactions and responding to queries about transactions may be too costly (in terms of storage and processing requirements) for end users and service providers.

Therefore there is a need for a more resource efficient entity that can provide proof that a transaction exists on the blockchain. Moreover, it would be desirable if such an entity could provide proof of the integrity of the data stored (i.e. embedded) in a transaction. This is particularly desirable in a trust-less environment.

According to one aspect disclosed herein, there is provided a computer-implemented method of providing proof that a data item of a blockchain transaction exists on a blockchain, wherein the method is performed by a Merkle proof entity configured to store a set of transaction identifiers of respective blockchain transactions but not to publish new blockchain blocks to the blockchain network, and wherein the method comprises: obtaining, from a requesting party, target data item of a target blockchain transaction; obtaining the target blockchain transaction; obtaining a target Merkle proof for the target blockchain transaction, wherein a corresponding target Merkle root is contained within a block of the blockchain, and wherein obtaining the target Merkle proof comprises calculating an index of a target transaction identifier of the target blockchain transaction within a leaf layer of a corresponding target Merkle tree; and outputting at least the target Merkle proof for use by the requesting party as proof that the target data item exists as part of the target blockchain transaction on the blockchain.

The Merkle proof entity does not perform operations of constructing and/or publishing blocks on the blockchain. In other words, the Merkle proof entity is not a blockchain node (not a "miner" according to one terminology used for such nodes in the art). The Merkle proof entity, also referred to below as a Merkle proof server (MPS), is able to provide Merkle proofs to a requesting party but does not partake in transaction validation or block construction, thus being less resource intensive than blockchain nodes. Data storage, data search, and data retrieval is optimized by storing only the relevant information, which in this case is the stored set of transactions.

In some examples, the MPSs can serve Merkle proofs without having to store the entire blockchain, thus having a significantly reduced storage requirement compared to blockchain nodes. The MPS may, for example, store only those transactions of interest in raw format. The stored transactions may relate to a particular application or service. As a particular example, the stored transactions may contain medical data of one or more patients. As another example, the stored transactions may contain any transactions containing a particular data item (e.g. a public key hash). The MPS support queries by data fields in the transactions such as addresses, public keys, data protocol flags, etc., or any partial transaction data.

In other examples, the MPS may provide its service over the entire domain of blockchain transactions. Whilst having the same storage requirements as a blockchain node in terms of transactions, the MPS has a reduced processing requirement as it does not need to validate the transactions. To provide a Merkle proof, the MPS may simply build a Merkle tree from the transaction data or corresponding TxIDs, without verifying those transactions explicitly. The MPS identifies a transaction containing the queried data and outputs a Merkle proof for the transaction containing that data. The Merkle proof proves that the transaction exists on the blockchain. Therefore if the queried data exists in the transaction, then the queried data exists in the transaction on the blockchain. Note that this is due to the fact that any alteration of the data in the raw transaction would mean that the Merkle proof would be invalid. In other words, the slightest change in the raw transaction would mean that that the transaction identifier (TxID) of the transaction would change, and since the TxID is a leaf hash of a Merkle tree used to generate the Merkle proof, then the Merkle proof would not lead to the required Merkle root (i.e. the Merkle root stored in a block containing the transaction).

By determining the index of the target transaction identifier, i.e. the leaf hash of the target transaction, the MPS can correctly identify the correct hashes to provide as part of the Merkle proof.

Moreover, a transaction can be proven to exist on the blockchain if its Merkle proof is provided or if one of its outputs is spent and the Merkle proof of the spending transaction is provided along with the raw spending transaction. This observation may be used to minimize the number of proofs required for a chain of related transactions. More details are provided below.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Example System Overview

Figure 1:
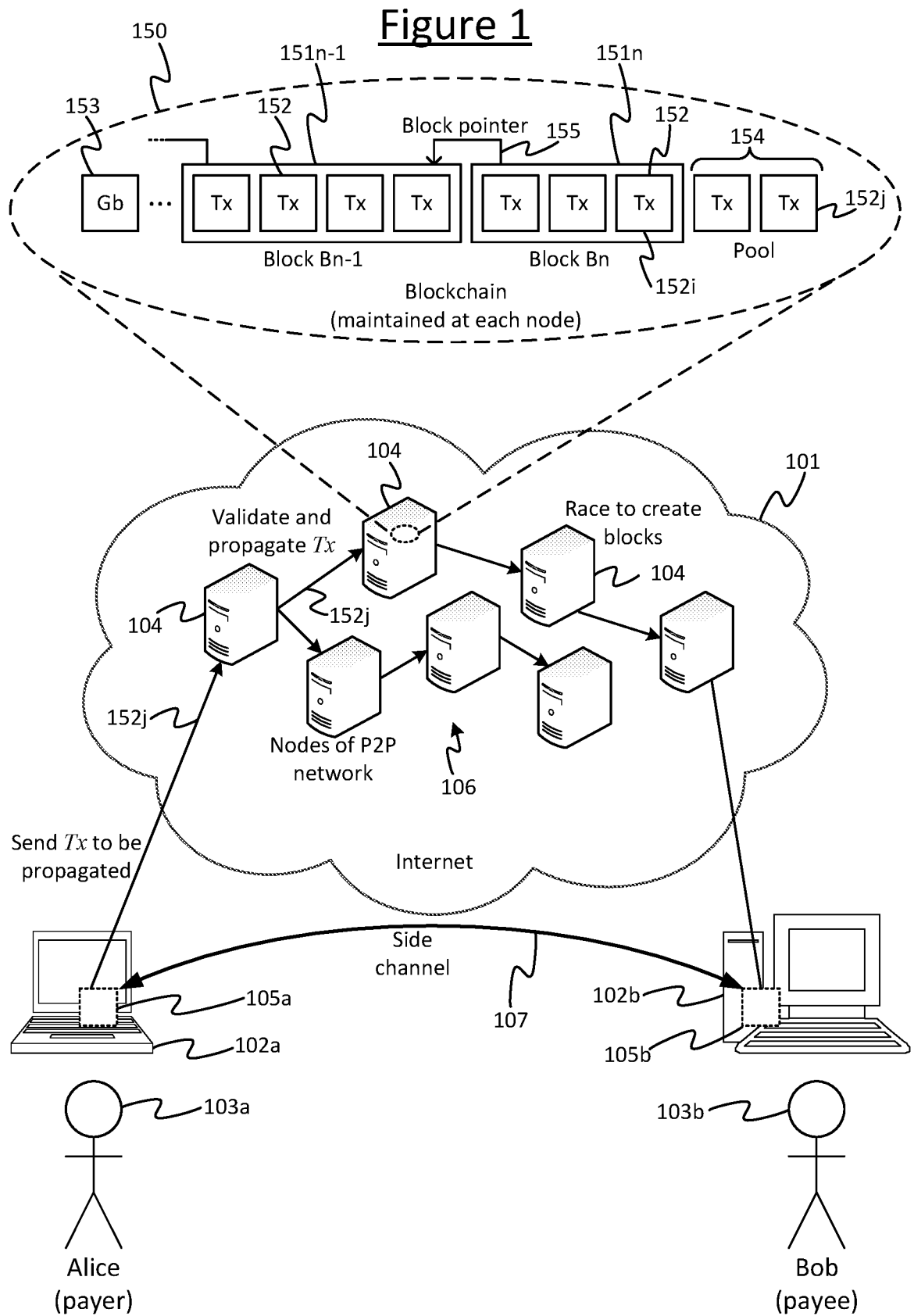
FIG. 1 is a schematic block diagram of a system for implementing a blockchain.

FIG. 1 shows an example system 100 for implementing a blockchain 150. The system 100 may comprise a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152$j$, the (or each) input comprises a pointer referencing the output of a preceding transaction 152$i$ in the sequence of transactions, specifying that this output is to be redeemed or "spent" in the present transaction 152$j$. In general, the preceding transaction could be any transaction in the ordered set 154 or any block 151. The preceding transaction 152$i$ need not necessarily exist at the time the present transaction 152$j$ is created or even sent to the network 106, though the preceding transaction 152$i$ will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152$i$, 152$j$ be created or sent out-of-order (see discussion below on orphan transactions). The preceding transaction 152$i$ could equally be called the antecedent or predecessor transaction.

The input of the present transaction 152$j$ also comprises the input authorisation, for example the signature of the user 103$a$ to whom the output of the preceding transaction 152$i$ is locked. In turn, the output of the present transaction 152$j$ can be cryptographically locked to a new user or entity 103$b$. The present transaction 152$j$ can thus transfer the amount defined in the input of the preceding transaction 152$i$ to the new user or entity 103$b$ as defined in the output of the present transaction 152$j$. In some cases a transaction 152 may have multiple outputs to split the input amount between multiple users or entities (one of whom could be the original user or entity 103$a$ in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152$j$ (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152$j$ could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152$j$ matches the expected signature, which depends on the previous transaction 152$i$ in an ordered sequence of transactions 152.

In such an output-based transaction protocol, this may comprise checking that the cryptographic signature or other authorisation of the party 103 included in the input of the new transaction 152*j* matches a condition defined in the output of the preceding transaction 152*i* which the new transaction assigns, wherein this condition typically comprises at least checking that the cryptographic signature or other authorisation in the input of the new transaction 152*j* unlocks the output of the previous transaction 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104.

In an output-based model, the definition of whether a given output (e.g. UTXO) is assigned (e.g. spent) is whether it has yet been validly redeemed by the input of another, onward transaction 152*j* according to the blockchain node protocol. Another condition for a transaction to be valid is that the output of the preceding transaction 152*i* which it attempts to redeem has not already been redeemed by another transaction. Again if not valid, the transaction 152*j* will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151*n* pointing back to the previously created block 151*n*-1 in the chain. The significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151*n* and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151*n*. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151*n* in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system 100, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152$j$, it handles it in accordance with the blockchain node protocol and its respective role. This comprises first checking whether the newly received transaction 152$j$ meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152$j$ passes the test for being deemed valid (i.e. on condition that it is "validated"), any blockchain node 104 that receives the transaction 152$j$ will add the new validated transaction 152 to the ordered set of transactions 154 maintained at that blockchain node 104. Further, any blockchain node 104 that receives the transaction 152$j$ will propagate the validated transaction 152 onward to one or more other blockchain nodes 104 in the network 106. Since each blockchain node 104 applies the same protocol, then assuming the transaction 152$j$ is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152$j$). Once the proof-of-work has been done for the pool 154 including the new transaction 152$j$, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

Figure 2:
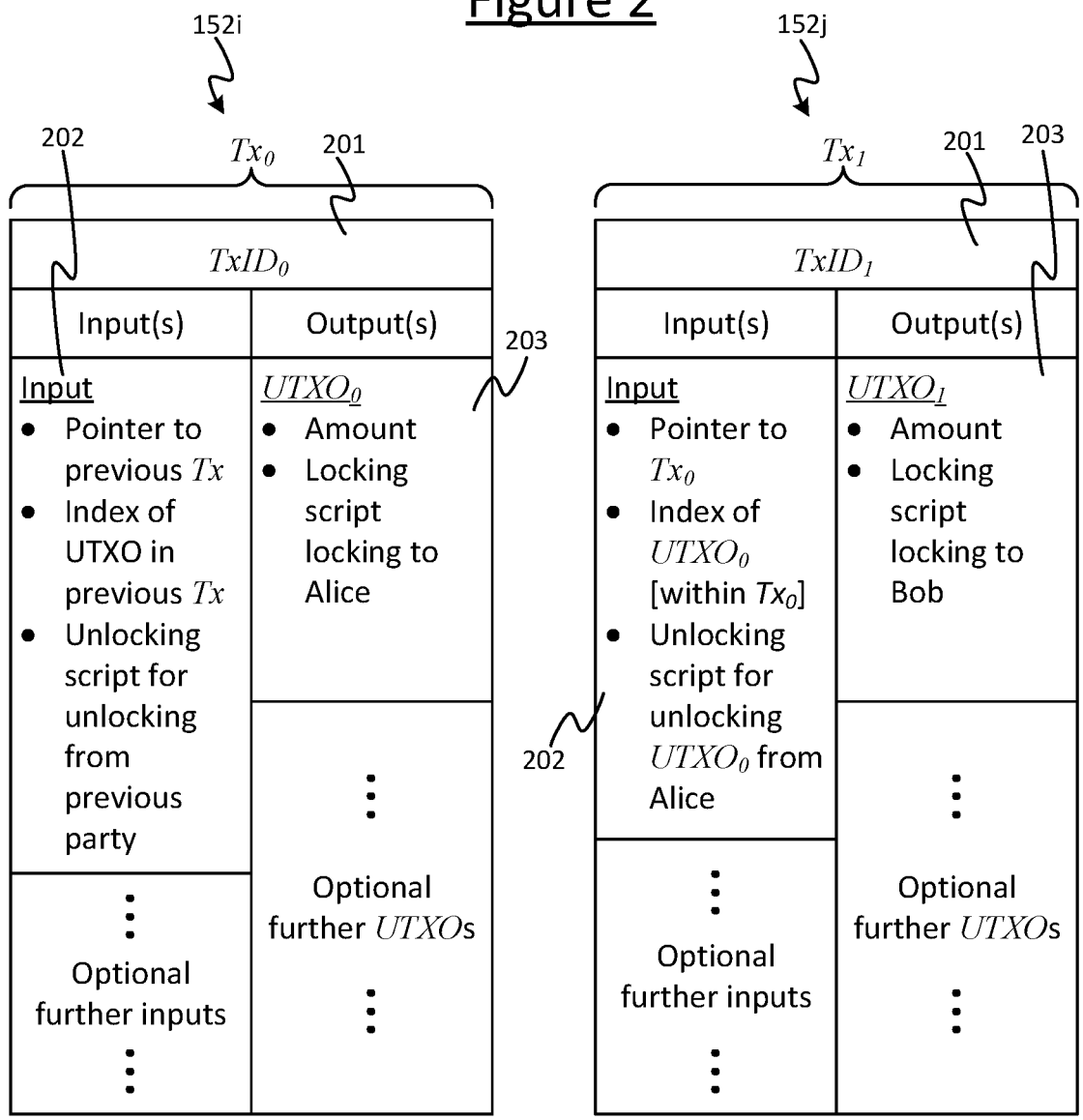
FIG. 2 schematically illustrates some examples of transactions which may be recorded in a blockchain.

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103$a$ wishes to create a transaction 152$j$ transferring an amount of the digital asset in question to Bob 103$b$. In FIG. 2 Alice's new transaction 152$j$ is labelled "$Tx_1$". It takes an amount of the digital asset that is locked to Alice in the output 203 of a preceding transaction 152$i$ in the sequence, and transfers at least some of this to Bob. The preceding transaction 152$i$ is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig$P_A$]

where "|" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_..." refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain. Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Client Software

Figure 3A:
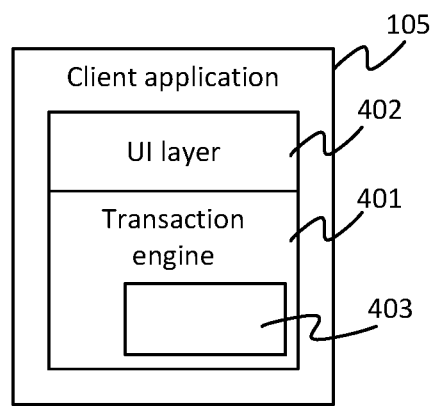
FIG. 3A is a schematic block diagram of a client application.

FIG. 3A illustrates an example implementation of the client application 105 for implementing embodiments of the presently disclosed scheme. The client application 105 comprises a transaction engine 401 and a user interface (UI) layer 402. The transaction engine 401 is configured to implement the underlying transaction-related functionality of the client 105, such as to formulate transactions 152, receive and/or send transactions and/or other data over the side channel 301, and/or send transactions to one or more nodes 104 to be propagated through the blockchain network 106, in accordance with the schemes discussed above and as discussed in further detail shortly.

The UI layer 402 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of the transaction engine 401 may be implemented in a separate application than the UI layer 402, or the functionality of a given module such as the transaction engine 401 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 3B:
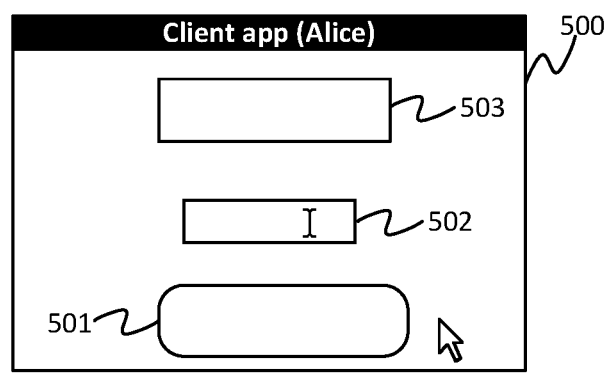
FIG. 3B is a schematic mock-up of an example user interface that may be presented by the client application of FIG. 3A, FIG. 4 schematically illustrates an example Merkle tree, FIG. 5 schematically illustrates an example Merkle proof, FIGS. 6A and 6B schematically illustrate example systems according to some embodiments of the present invention, FIG. 7 schematically illustrates data stored by a secondary Merkle proof entity according to some embodiments of the present invention.

FIG. 3B gives a mock-up of an example of the user interface (UI) 500 which may be rendered by the UI layer 402 of the client application 105a on Alice's equipment 102a. It will be appreciated that a similar UI may be rendered by the client 105b on Bob's equipment 102b, or that of any other party.

By way of illustration FIG. 3B shows the UI 500 from Alice's perspective. The UI 500 may comprise one or more UI elements 501, 502, 502 rendered as distinct UI elements via the user output means.

For example, the UI elements may comprise one or more user-selectable elements 501 which may be, such as different on-screen buttons, or different options in a menu, or such like. The user input means is arranged to enable the user 103 (in this case Alice 103a) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands).

Alternatively or additionally, the UI elements may comprise one or more data entry fields 502. These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 503 output to output information to the user. E.g. this/these could be rendered on screen or audibly.

It will be appreciated that the particular means of rendering the various UI elements, selecting the options and entering data is not material. The functionality of these UI elements will be discussed in more detail shortly. It will also be appreciated that the UI 500 shown in FIG. 3 is only a schematized mock-up and in practice it may comprise one or more further UI elements, which for conciseness are not illustrated.

Merkle Trees

Merkle Trees are hierarchical data structures that enable secure verification of collections of data. In a Merkle tree, each node in the tree has been given an index pair (i,j) and is represented as N(i,j). The indices i,j are simply numerical labels that are related to a specific position in the tree.

A feature of the Merkle tree is that the construction of each of its nodes is governed by the following equations $$N(i, j) = \begin{cases} H(D_i) & i = j \\ H(N(i, k) \| N(k+1, j)) & i \neq j \end{cases},$$

where and H is a cryptographic hash function.

Figure 4:
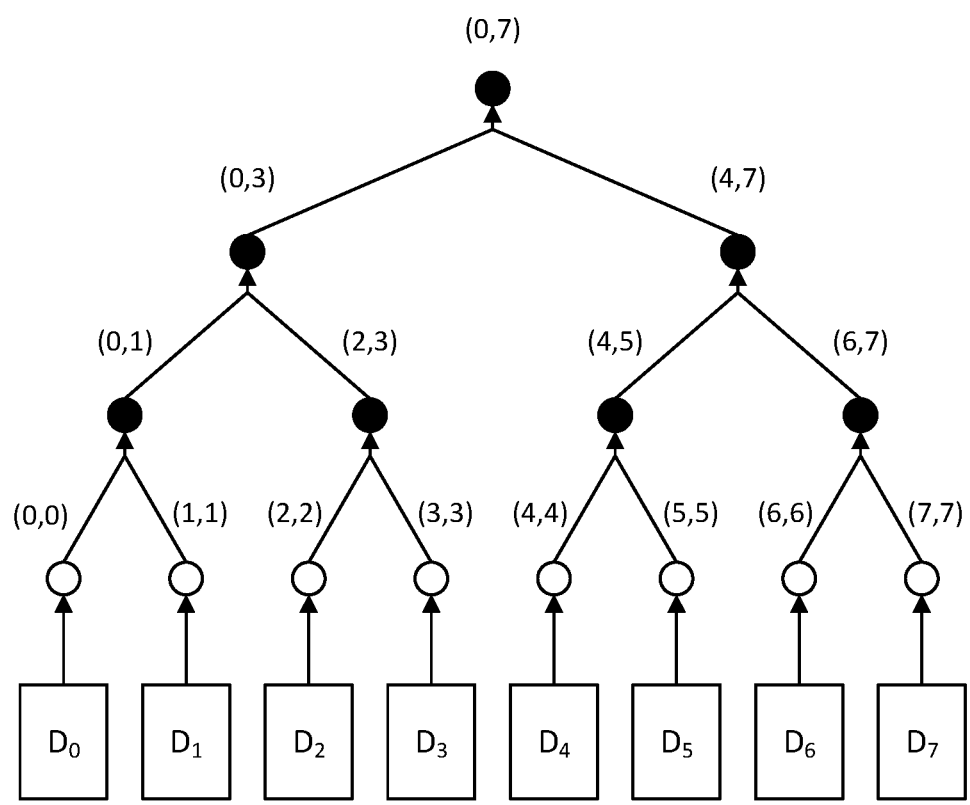

A binary Merkle tree constructed according to these equations is shown in FIG. 4. As shown, we can see that the i=j case corresponds to a leaf node, which is simply the hash of the corresponding $i^{th}$ packet of data $D_i$. The i≠j case corresponds to an internal or parent node, which is generated by recursively hashing and concatenating child nodes until one parent (the Merkle root) is found.

For example, the node N(0,3) is constructed from the four data packets $D_0, \ldots, D_3$ as $$\begin{aligned} N(0, 3) &= H(N(0, 1) \| N(2, 3)) \\ &= [H(N(0, 0) \| N(1, 1)) \| H(N(2, 2) \| N(3, 3))] \\ &= [H(H(D_0) \| H(D_1)) \| H(H(D_2) \| H(D_3))] \end{aligned}$$

The tree depth M is defined as the lowest level of nodes in the tree, and the depth m of a node is the level at which the node exists. For example, $m_{root}=0$ and $m_{leaf}=M$, where M=3 in FIG. 4.

For Merkle trees in Bitcoin and some other blockchains, the hash function is double SHA256, which is to apply the standard hash function SHA-256 twice: H(x)=SHA256(SHA256(x)).

Merkle Proofs

The primary function of a Merkle tree is to verify that some data packet $D_i$ is a member of a list or set of N data packets $D \in \{D_0, \ldots, D_{N-1}\}$. The mechanism for verification is known as a Merkle proof and involves obtaining a set of hashes known as the Merkle path for a given data packet $D_i$ and Merkle root R. The Merkle proof for a data packet is simply the minimum list of hashes required to reconstruct the root R by way of repeated hashing and concatenation, often referred to as the 'authentication proof'.

A proof of existence could be performed trivially if all packets $D_0, \ldots, D_{N-1}$ and their order are known to the prover. This does however require a much larger storage overhead than the Merkle proof, as well as requiring that the entire data set is available to the prover. The comparison between using a Merkle proof and using the entire list is shown in the table below, where we have used a binary Merkle tree and assumed that the number of data blocks N is exactly equal to an integer power 2.

The following table shows the relationship between the number of leaf nodes in a Merkle tree and the number of hashes required for a Merkle proof (or Merkle proof).

|  |  |  |  |  | Merkle tree |
| --- | --- | --- | --- | --- | --- |
| No. data packets | 32 | 256 | 1024 | 1048576 | $N = 2^M$ |
| No. hashes required for proof of existence | 5 | 8 | 10 | 20 | $M = \log_2 N$ |

In this simplified scenario—where the number of data packets is equal to the number of leaf nodes—we find that the number of hash values required to compute a Merkle proof scales logarithmically. It is clearly far more efficient and practical to compute a Merkle proof involving $\log_2 N$ hashes than to store N data hashes and compute the explicit proof.

Method

If, given a Merkle root R, we wish to prove that the data block $D_0$ belongs to the ordered list $D \in \{D_0, \ldots, D_{N-1}\}$ represented by R we can perform a Merkle proof as follows
  i. Obtain the Merkle root R from a trusted source.
  ii. Obtain the Merkle proof Γ from a source. In this case, Γ is the set of hashes:

Γ={N(1,1),N(2,3),N(4,7)}.

iii. Compute a Merkle proof using $D_1$ and Γ as follows:
    a. Hash the data block to obtain:

N(0,0)=H($D_0$).

b. Concatenate with N(1,1) and hash to obtain:

N(0,1)=H(N(0,0)∥N(1,1)).

c. Concatenate with N(2,3) and hash to obtain:

N(0,3)=H(N(0,1)∥N(2,3)).

d. Concatenate with N(4,7) and hash to obtain the root:

N(0,7)=H(N(0,3)∥N(4,7)),

R'=N(0,7).

e. Compare the calculated root R' with the root R obtained in (i):
      1. If R'=R, the existence of $D_0$ in the tree and therefore the data set D is confirmed.

2. If R' #R, the proof has failed and $D_0$ is not confirmed to be a member of D.

This is an efficient mechanism for providing a proof of existence for some data as part of the data set represented by a Merkle tree and its root. For example, if the data $D_0$ corresponded to a blockchain transaction and the root R is publicly available as part of a block header then we can quickly prove that the transaction was included in that block.

The process of authenticating the existence of $D_0$ as part of our example Merkle tree is shown in FIG. 5. This demonstrates that performing the Merkle proof for a given block $D_0$ and root R is effectively traversing the Merkle tree 'upwards' by using only the minimum number of hash values necessary.

Minimum Information to Construct the Merkle Proof

When constructing a Merkle proof of a single leaf, the minimal information required is
1. Index of the leaf: the position of the leaf in the leaf layer in the Merkle tree.
2. An ordered list of hash values: the hash values required to calculate the Merkle root.

To explain how the index of the leaf works, consider the Merkle tree in FIG. 5. Bob knows the root R but does not know all the leaves of the Tree. The Merkle branch for $D_0$ consists of one index, 0, and three hash values (circled). The index is to indicate whether the provided hash value should be concatenated to the left or to the right of the calculated hash value.

Assume that a Merkle tree has $N=2^M$ leaves. Given an index i at layer 0, let $i_0=i$, $b_0=i_0 \bmod 2$, $p_0=i_0+(-1)^{b_0}$, i.e $$p_0 = \begin{cases} i_0 + 1 & i_0 \text{ is even} \\ i_0 - 1 & i_0 \text{ is odd} \end{cases}$$

$p_0$ is the index of the pair leaf node of the leaf node with index $i_0$. We refer to them as pairs since they are concatenated and hashed to calculate their parent hash node in the Merkle Tree (see above). The node with index $p_0$ is also referred to as "the provided hash" or "the required data" since it must be provided when calculating the Merkle root of the $i_0$ leaf node.

Thus, we can define at layer m, we have $$i_m = \frac{i_{m-1} - b_{m-1}}{2}$$
$$b_m = i_m \bmod 2$$

Then the index of the provided hash is $$p_m = i_m + (-1)^{b_m}$$

The above equations assume that the index starts at 0.

In the context of the present invention, the leaf node with index $i_0$ is a transaction identifier of the target transaction.

Proof of Existence—Transaction Data

Figure 6A:
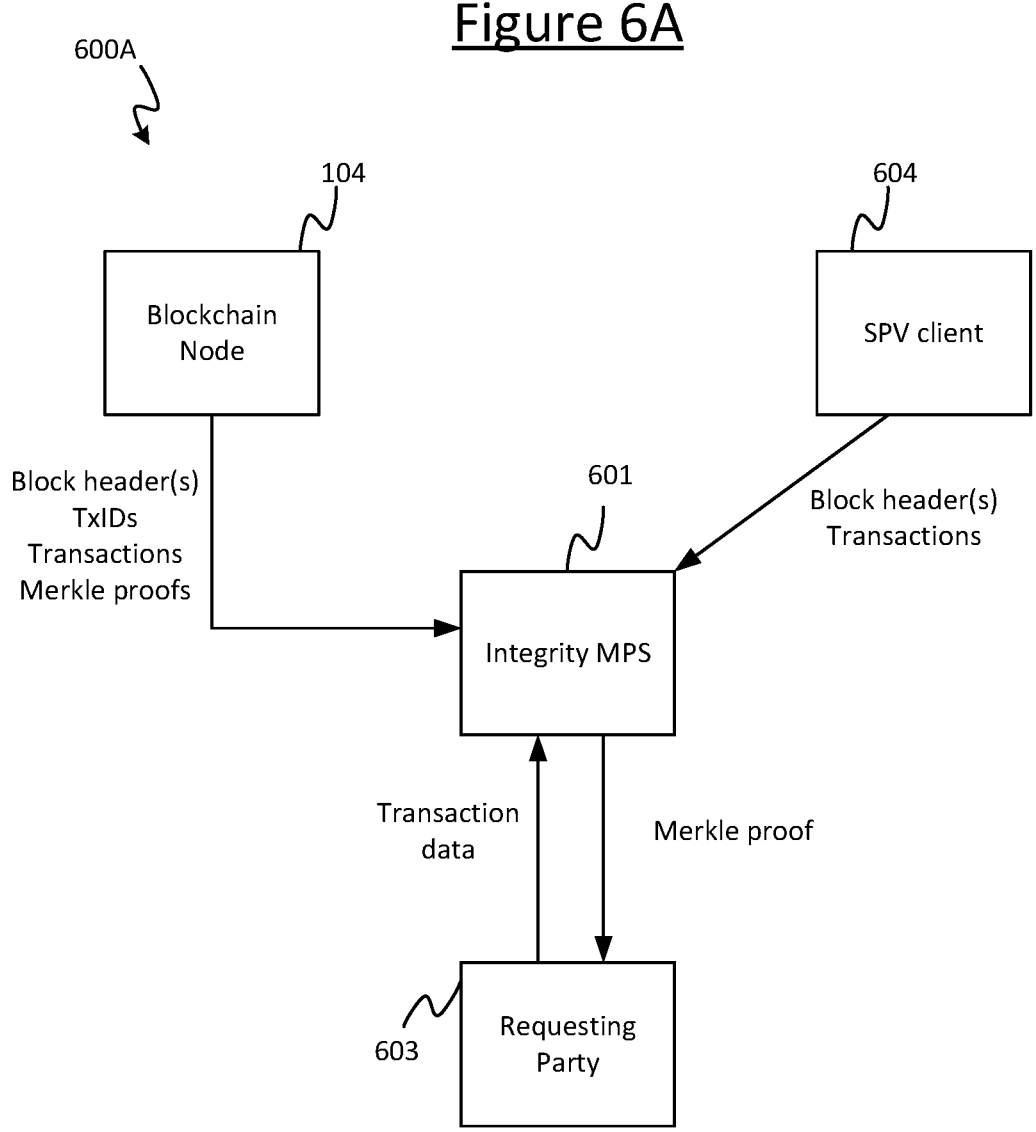

FIG. 6A illustrates an example system 600 for implementing embodiments of the present invention. The system comprises a Merkle proof entity (or Merkle proof server (MPS)) 601. Note that the term "Merkle proof entity" is used merely as a convenient label for an entity configured to perform the actions described herein. Similarly, the term "Merkle proof server" does not necessarily mean that the described actions are performed by a server (i.e. a dedicated or traditional server unit or system like a rack or data centre), although that is one possible implementation. Also shown is a blockchain node 104, a requesting party 603 and an SPV client 604. Whilst only one of each of these entities are shown, it should be appreciated that the system 600 may in general comprise any number of each of these entities.

The MPS 601 is configured to provide proof that a particular data item of a transaction exists on the blockchain 150, i.e. that a transaction comprising the component exists on the blockchain. The MPS 601 is configured to store a set of transactions. In some examples, the MPS 601 stores only a subset of transactions that are stored on the blockchain, i.e. not the whole blockchain 150. For instance, the MPS 601 may store transactions of interest, transactions relating to a particular application or service, transactions containing a particular locking script, protocol flag, public key, etc., transactions containing media content, etc. In some examples all of the stored transactions have something in common, e.g. all transactions from a particular block, all transactions published after a certain time, or between two times (time may be measured in UNIX time or block height), all transactions from a block or blocks published by a particular blockchain node 104, etc. Alternatively, the MPS 601 may store the full blockchain, i.e. all published transactions.

The MPS 601 is not a blockchain node 104. That is, the MPS 601 is not a mining node or "miner". The MPS 601 may be operated by or connected to a blockchain node, but the MPS 601 itself does not perform operations of validating transaction, performing proof-of-work, constructing blocks, publishing blocks, enforcing consensus rules, etc.

The MPS 601 is configured to obtain a target data item of a target transaction, i.e. a data item of or associated with a transaction. For instance, the system 600 may comprise one or more requesting parties 603. A requesting party 603 may send the target data item to the MPS 601 as part of a request for a Merkle proof for a transaction containing the target data item. In some examples the mere sending of the target data item to the MPS 601 is taken as a request for the Merkle proof.

The MPS 601 is configured to obtain the target transaction. The target transaction may be obtained from storage (i.e. the stored set of transactions contains the target transaction). For instance, the MPS 601 may identify the target transaction based on the target data item, e.g. for searching for a transaction comprising the target data item. As a particular example, the target data item may be a transaction identifier (TxID). A TxID uniquely identifies a transaction. The MPS 601 may perform a look-up using the TxID. As another example, the target data item may be a public key or public key hash. The MPS 6021 may search for a transaction comprising the public key or public key hash in an input and/or output of the transaction. Or, the target transaction may be provided to the MPS 601 along with the target data item.

Having obtained the target transaction, the MPS 601 is also configured to obtain a "target Merkle proof" for the target transaction, i.e. a Merkle proof for proving that the target transaction exists on the blockchain. The target Merkle proof comprises at least an ordered set of hash values. The number of hash values in the ordered set of hash values is based on the number of leaves in the Merkle tree, i.e. the number of transactions in the block 151 containing the target transaction. The Merkle proof may also include an index of the leaf indicating whether the first hash value in the ordered set of hash values should be concatenated to the left or to the right of the target TxID (i.e. a TxID of the target transaction).

The MPS 601 may store a respective Merkle proof for each stored transaction. That is, the target Merkle proof may be stored for later use when needed.

Obtaining the target Merkle proof comprises extracting the target Merkle proof from storage or calculating the target Merkle proof on-the-fly. For example, the MPS 601 may pre-calculate the Merkle proof for one or more transactions, or instead calculate the Merkle proof in response to receiving a request from the requesting party. Note that in order to calculate the target Merkle proof, all of the transactions of a given block are required such that a Merkle tree can be generated. The MPS 601 may obtain a full block of transactions, calculate the Merkle tree for that block, and then prune the transactions that are not required. Or, the MPS 601 may obtain the Merkle tree from a different source. The MPS 601 may then store the Merkle tree or only the Merkle proofs for the transactions of interest. When the target transaction is obtained, the MPS 601 looks up the corresponding Merkle proof from memory (each Merkle proof may be associated with a respective transaction or TxID in storage).

The target Merkle proof may comprise one or more internal hashes, or internal nodes, of a corresponding Merkle tree. In that case, it is useful to provide the requesting party with the indices of those internal hashes so that the requesting party knows whether to concatenate the preceding hash (e.g. the target TxID) to the left or right of the internal hash. Therefore, when extracting the target Merkle proof, the MPS 601 calculates the indices of the internal hashes in the target Merkle proof using the index of the leaf hash, i.e. the TxID of the target transaction. The MPS needs to calculate these indices in order to extract the Merkle proof from the stored tree, i.e. the MPS has a tree stored, and the leaf index allows it to determine which internal nodes to cherry-pick from the tree to extract the correct Merkle proof.

Note that at least in some examples, the MPS 601 need calculate only the index of the target TxID. This single index may be enough to determine the required internal hashes.

In addition to the option of storing a respective Merkle proof for each transaction, the MPS may pre-calculate and store one or more Merkle trees. Each Merkle tree comprises a plurality of the stored set of TxIDs, a set of internal hash values (or internal nodes) and a Merkle root. In this example, obtaining the target Merkle proof comprises using the calculated index of the target TxID to extract the target Merkle proof (i.e. the required hash values) from the Merkle tree containing the target TxID.

As another example, the MPS 601 may calculate the target Merkle proof in response to obtaining the target TxID. That is, the MPS 601 may use one or more of the stored set of TxIDs to calculate the target Merkle proof (e.g. by calculating a complete Merkle tree and using the index of the target TxID to extract the required hash values). Note that this method requires the MPS 601 to have, in storage, all of the transactions from the block 151 comprising the target transaction.

Another option for obtaining the target Merkle proof is for the MPS 601 to receive and store one or more Merkle proofs from a different entity, e.g. a blockchain node 104 or an SPV client application. Depending on the level of trust afforded to this entity, the MPS 601 may verify that the obtained Merkle proof(s) have been correctly calculated. For instance, a Merkle proof can be verified against the respective block header of the respective block containing the respective transaction for which the Merkle proof is intended for use with. In this case, the MPS 601 may choose to store only the received Merkle proofs which have been verified.

The MPS 601 is also configured to output the target Merkle proof. For instance, the target Merkle proof may be transmitted directly to the requesting party 603. Or, the target Merkle proof may be published, e.g. on a webpage. The target Merkle proof can be used as proof that the target transaction exists on the blockchain. The MPS 601 may also output the target transaction to the requesting party 603. This is not necessary if the requesting party 603 has access to the target transaction.

Figure 8:
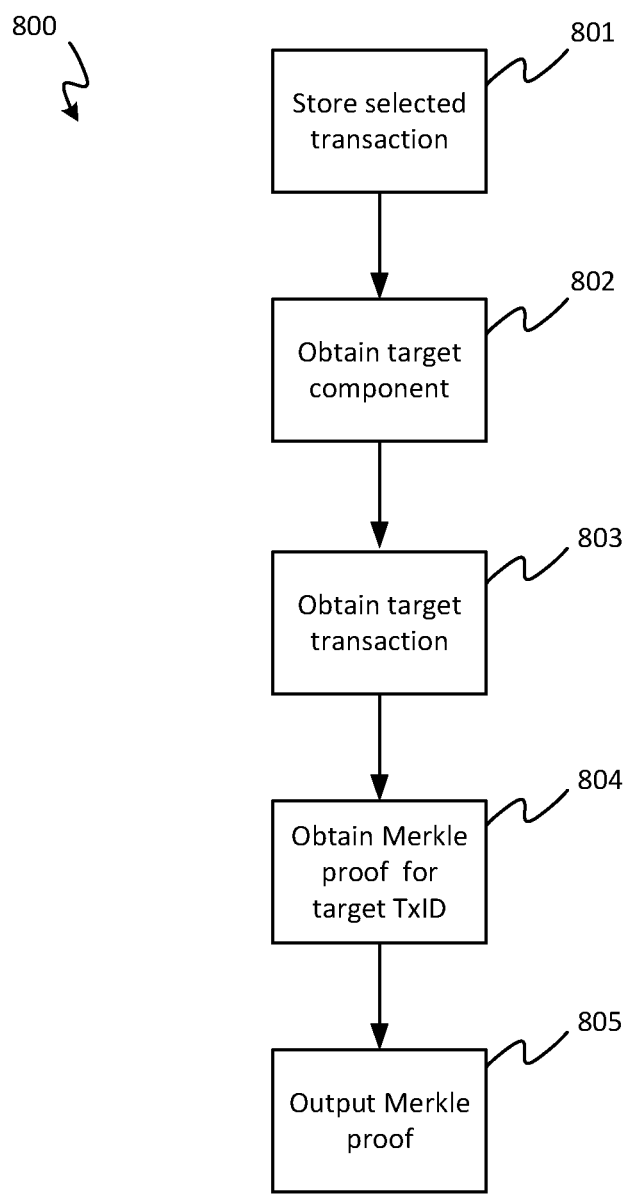
FIG. 8 illustrates an example method according to some embodiments of the present invention.

FIG. 8 illustrates an example method 800 that may be performed by the MPS 601. At step 801, the MPS 601 stores a set of selected transactions (e.g. those having at least one unspent transaction output). At step 802, the MPS 601 obtains a target data item (e.g. a protocol flag, public key, etc.). At step 803, the MPS 601 obtains one or more target transactions comprising the target data item. At step 804, the MPS 601 obtains one or more Merkle proofs, e.g. one for each target transaction. At step 805, the MPS 601 outputs the Merkle proof(s).

Each block 151 of the blockchain 150 comprises a respective block header. The MPs 601 may store one or more block headers. For instance, the MPS 601 may store a block header for every published block 151. The block headers may be stored in an ordered list. The order of block headers may match the order of the corresponding blocks 151 in the blockchain 150. In some examples, the transactions from a given block 151 may be stored in associated with the block header for that block 151. Rather than storing the complete block header, the MPS 601 may in some examples only store one or more but not all of the data fields of the block header. For instance, the MPS 601 may store only the Merkle root contained within the block header. Or, the MPS 601 may store the Merkle root and the previous hash contained within the block header (the previous hash stored in block header n is equal to the n-1th block header).

In some examples, the MPS 601 may also output the Merkle root from the block header of the block 151 containing the target transaction. The Merkle root may be output as part of the block header containing the Merkle root, or on its own, or in combination with one or more other data fields of the block header, e.g. the previous block hash. The Merkle root may be output directly to the requesting party 603 or otherwise published.

The MPS 601 may store the transactions in groups based on the block in which the corresponding transactions are published. That is, the transactions from block n may be stored in one group, the transactions from block n-1 may be stored in a different group, and so on. The transactions in each group may be stored in an ordered list, where the order of transactions in the list matches the order of the transactions in a given block 151. Note that the list of stored transactions may contain fewer transactions that the corresponding block 151 since the MPS 601 does not store the full blockchain 150.

The MPS 601 may obtain some or all of the stored transactions from the blockchain network 106, e.g. from blockchain nodes 104. All of the transactions may be obtained from a single blockchain node 104. Alternatively, the transactions may be obtained from multiple nodes, e.g. some from one blockchain node 104, some from a different blockchain node 104, etc. The same applies to the block headers. That is, some or all of the stored block headers (or just the stored Merkle roots and/or previous block hashes)

may be obtained from a single blockchain node 104 or from across multiple nodes 104. In some examples, the MPS 601 may obtain all of the transactions (or at least those of interest) from a given block (and optionally the block header of that block) from the same blockchain node 104. The MPS 601 may obtain, from a node 104, a full block of transactions and then filter or prune the block of transactions to obtain those of interest (e.g. those containing a particular data field or data item). The remaining transactions are stored by the MPS.

In some examples, the MPS 601 may verify some or all of the obtained transactions and/or block headers by obtaining the same transactions and/or block headers from multiple nodes 104.

It is also not excluded that the MPS 601 may obtain one or more of the stored transactions from an entity other than a blockchain node 104. For instance, the MPS 601 may obtain transactions from an application provider, e.g. the application provider sends the transactions relating to the corresponding application to the MPS 601. As another example, an entity (e.g. service provider) may send all of the transactions generated by that entity to the MPS 601.

In some examples, the MPS 601 may request the raw transaction data corresponding to a respective TxID. That is, the MPS 601 may store one or more TxIDs and then obtain the corresponding transaction(s) from a different entity, e.g. a blockchain node 104 or SPV client. Once the MPS 601 has obtained the raw transaction data, it may then delete the TxIDs since they can be regenerated from the raw data.

Similarly, the MPS 601 may obtain one or more block headers from an entity other than a blockchain node 104. For example, the MPS 601 may obtain block headers from one or more SPV clients.

In some examples, the MPS 601 may store the coinbase transaction for each block (recall there is only one coinbase transaction per block). In these examples the MPS 601 may obtain a Merkle proof for the coinbase transaction that is published in the same block as the target transaction. The MPS 601 may then output the Merkle proof for the coinbase transaction, together with the coinbase transaction itself, e.g. to the requesting party 603. This can be used by the requesting party 603 to verify that the target Merkle proof is of the correct length. For example, if the length of the Merkle proof for the coinbase transaction is ten (i.e. ten hash values), then the length of the target Merkle proof should also be ten.

In some examples, the transactions stored by the MPS 601 may comprise one or more chains of transactions. A Merkle proof for the target transaction may be used to prove the existence of one or more parent transactions, and thus the data in those transactions. In this case, if the target transaction is a child transaction, the target Merkle proof proves that each of the parent transactions has been published on the blockchain 150 (the child transaction could not have been published on the blockchain 150 without each of the parent transactions being published on the blockchain 150). In general, a Merkle proof for the most recently published transaction in a chain of transactions proves the existence of all other transactions in that chain. The MPS 601 may output each transaction in the chain of transactions, along with the target Merkle proof for the target transaction, e.g. directly to the user.

In examples where the MPS 601 stores the Merkle proofs for the stored transactions, to reduce storage the MPS 601 may store only the Merkle proof for the target transaction and not the other transactions in the chain of transactions.

In some cases the target data item may be present in more than one transaction. That is, there may exist on the blockchain 150 multiple transactions. If the MPS 601 identifies more than one transaction containing the target data item, the MPS 601 may obtain and output a respective Merkle proof for each of the identified transactions. The MPS 601 may also output each of the identified transactions. Or, as described above, if each of the identified transactions form a chain of transactions, the MPS 601 may output each of the identified transactions and only a Merkle proof for a most recent one of the transactions (i.e. the target transaction).

The MPS 601 take the form of computing apparatus (e.g. similar to that shown in FIG. 1) comprising one or more user terminals, such as a desktop computer, laptop computer, tablet, smartphone, wearable smart device such as a smart watch, or an on-board computer of a vehicle such as car, etc. Additionally or alternatively, the computing apparatus may comprise a server. A server herein refers to a logical entity which may comprise one or more physical server units located at one or more geographic sites. Where required, distributed or "cloud" computing techniques are in themselves known in the art. The one or more user terminals and/or the one or more server units of the server may be connected to one another via a packet-switched network, which may comprise for example a wide-area internetwork such as the Internet, a mobile cellular network such as a 3GPP network, a wired local area network (LAN) such as an Ethernet network, or a wireless LAN such as a Wi-Fi, Thread or 6LoWPAN network. The computing apparatus comprises a controller and an interface. The controller is operatively coupled to the interface 204. The controller is configured to perform the actions attributed to the MPS. The interface is configured to transmit and receive data, e.g. transactions, block headers, Merkle proofs, etc.

Each of the controller and interface may be implemented in the form of software code embodied on computer readable storage and run on processing apparatus comprising one or more processors such as CPUs, work accelerator coprocessors such as GPUs, and/or other application specific processors, implemented on one or more computer terminals or units at one or more geographic sites. The storage on which the code is stored may comprise one or more memory devices employing one or more memory media (e.g. electronic or magnetic media), again implemented on one or more computer terminals or units at one or more geographic sites. In embodiments, the controller and/or interface may be implemented on the server. Alternatively, a respective instance of one or both of these data items may be implemented in part or even wholly on each of one, some or all of the one or more user terminals. In further examples, the functionality of the above-mentioned data items may be split between any combination of the user terminals and the server. Again it is noted that, where required, distributed computing techniques are in themselves known in the art. It is also not excluded that one or more of these data items may be implemented in dedicated hardware.

The requesting party 603 will now be described. The requesting party 603 is configured to send a request to the MPS 601 for a Merkle proof. The requesting party 603 may send the target data item and/or the target transaction to the MPS 601. In response, the requesting party is configured to receive or otherwise obtain the target Merkle proof. The requesting party 603 may use the target Merkle proof to prove that the target transaction comprising the target data item exists on the blockchain 150. For instance, the requesting party 603 may send the target Merkle proof to a secondary receiving party, e.g. along with the target transaction. The requesting party 603 may also send the Merkle root (e.g. as part of a block header) of a Merkle tree based on the target transaction to the secondary receiving party. The Merkle root may be obtained from the MPS 601. The requesting party 603 may be (or operate) an SPV client. An SPV client is a client application configured to perform a SPV method. See e.g. wiki.bitcoinsv.io/index.php/Simplified_Payment_Verification for details. That is, the SPV client (e.g. operated by a spender) may use the target Merkle proof for performing the SPV method, i.e. by providing another party (e.g. a receiver) with the target Merkle proof. In this case the target transaction may comprise a UTXO (the target data item), locked to the spender, and referenced by a spending transaction that comprises a UTXO locked to the receiver.

In short, to spend a UTXO, a sender using an SPV wallet will pass on the following information to the receiver:
1. The transaction $Tx_0$ that contains the UTXO as an output,
2. The Merkle proof of $Tx_0$,
3. The block header that contains the Merkle root derived from the Merkle proof (or its identifier, e.g., block height),
4. The transaction $Tx_1$ that spends the UTXO.

To validate the information, the receiver computes the Merkle root from the Merkle proof of $Tx_0$. The receiver then compares it with the Merkle root specified in the block header. If they are the same, the receiver accepts that $Tx_0$ is in the blockchain.

The requesting party 603 may take the form of Alice 103*a* or Bob 103*b*.

Returning now to the MPS 601. The MPS 601 may be referred to as a secondary MPS, or an "integrity MPS". In these embodiments, the integrity MPS 601 may obtain the target Merkle proof from a primary MPS, or a "general MPS" 602. The general MPS is an entity configured to store a set of transaction identifiers of respective transactions. The general MPS 602 does not store the full blockchain data, i.e. every single published transaction in its entirety. The general MPS 602 is configured to obtain a target transaction identifier of a target transaction, obtain a target Merkle proof for the target blockchain transaction, wherein the target Merkle proof is based on one or more of the stored set of transaction identifiers, and output the target Merkle proof. Therefore the integrity MPS 601 may send the target transaction or target transaction TxID to the general MPS 602 and in return receive the target Merkle proof.

Figure 6B:
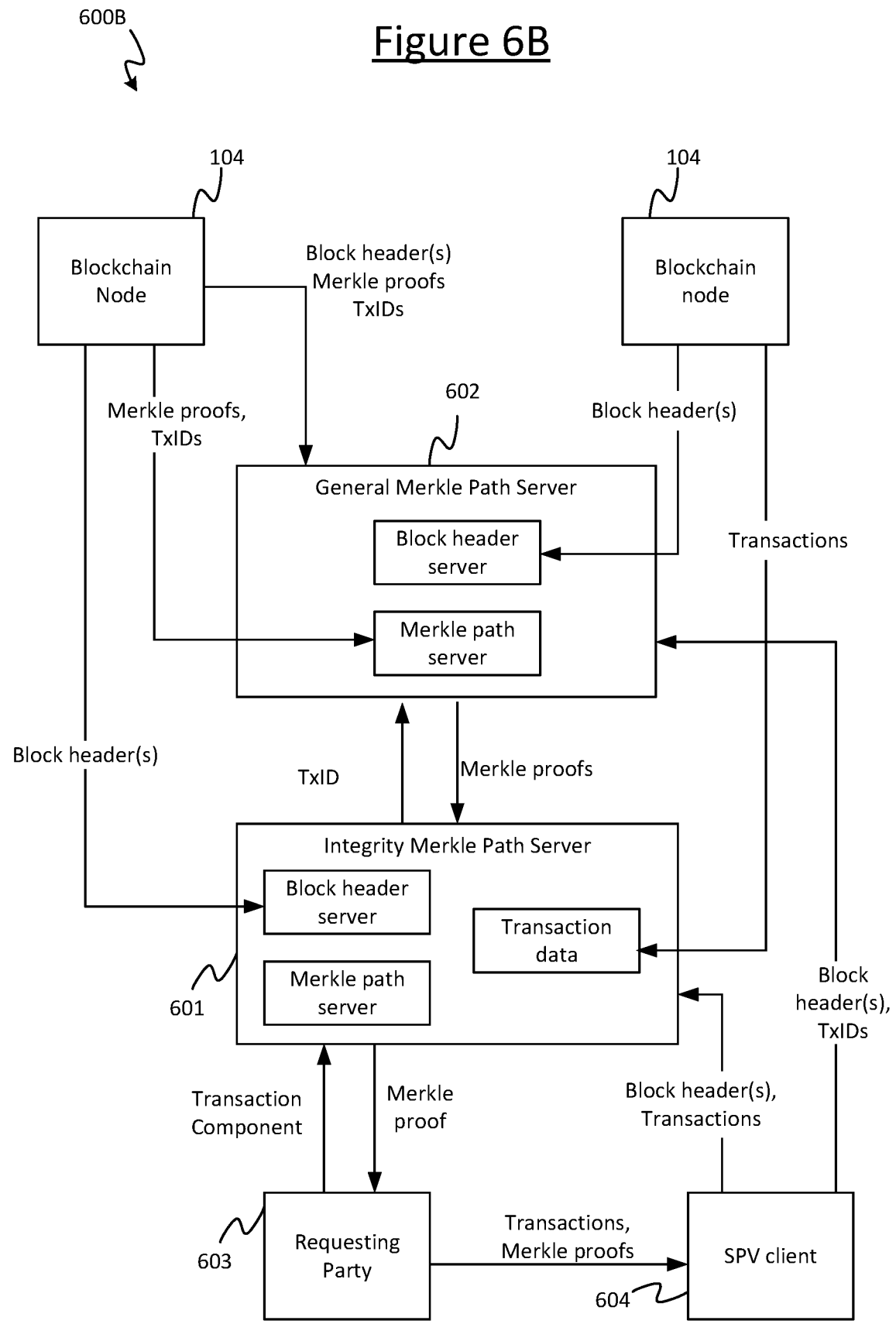

FIG. 6B illustrates an example system 600B showing the interaction between the integrity MPS 601 and the general MPS 602. As shown, the system 600B comprises one or more blockchain nodes 104, an integrity MPS 601, a general MPS 602, a requesting party 603 and an SPV client 604. The system 600B may comprise multiple requesting parties and/or SPV clients.

Starting with the general MPS 602, it is primarily concerned with providing a Merkle proof for a given transaction identifier (TxID). The general MPS 602 may output a Merkle proof to a requesting party 603, or to the integrity MPS 601. For instance, the requesting party 603 or integrity MPS 601 may send a TxID to the general MPS 602, and the general MPS 602 in return provides a Merkle proof. The general MPS 602 may obtain the data required to produce a Merkle proof from one or more sources. For instance, the Merkle proof itself may be obtained from a blockchain node 104. Or, the general MPS 602 may obtain TxIDs and corresponding block header(s) from a blockchain node 104, or from an SPV client 604. The general MPS 602 can calculate the Merkle proof using the TxIDs and corresponding block header.

As for the integrity MPS 601, it is primarily concerned with providing Merkle proofs to a requesting party 603. The integrity MPS 601 may receive a transaction component (or transaction data field or data item) from a requesting party 603 and in return provide a Merkle proof for the transaction containing that component. The requesting party 603 may in turn send the transaction and Merkle proof to another party, e.g. an SPV client 604. The integrity MPS 601 may obtain the transaction from a blockchain node 104 and/or an SPV client 604. The integrity MPS 601 may also obtain block headers from a blockchain node 104 and/or SPV client 604 to use as part of a Merkle proof, although block headers may be calculated by the integrity MPS if enough data is available.

In general the integrity MPS 601 may obtain multiple Merkle proofs from the general MPS 602, e.g. one for each of the stored transactions. For example, when the integrity MPS receives and stores a new transaction the integrity MPS 601 may send a request to the general MPS 602 for a Merkle proof for the new transaction.

An example implementation of some embodiments of the present invention will now be described.

General MPS

The general MPS 602 acts as a dedicated server to provide Merkle proofs to receiving parties, e.g. users. That is, the general MPS 602 is a server that provides the Merkle proof for a given transaction or transaction ID if the transaction is published on the blockchain. The general MPS 602 does not store full transaction data. It can be considered as a complement to a SPV client in the blockchain network with the storage of Merkle trees. More precisely, the general MPS has the following list of storage requirements:
1. An ordered list of block headers representing the chain with the most proof of work (optional requirement)
2. An ordered list of transaction IDs for each block header (core requirement)
3. A pre-calculated Merkle tree for each block header where the Merkle root matches the one specified in the block header (optional requirement)
4. The raw data of the coinbase transaction in each block or any raw data of a transaction in the block for each block header (optional requirement)

The first requirement is to ensure the data integrity of the general MPS 602. The Merkle root in the block header can be used as an integrity check on the lists of transaction IDs. That is, block headers can be used for checking that the TxIDs from a given block, when forming the leaves of a Merkle tree, give the Merkle root in a block header. The first requirement can be dropped, e.g. if the TxIDs are trusted or if the general MPS 602 has a secure access to a trusted SPV client, or any entity that is trusted to be storing the block headers of the chain with the most proof of work.

The second requirement is to provide the Merkle leaves in the order they appear in the Merkle tree so that one can reconstruct the Merkle trees. Note that the coinbase transaction ID is always the first leaf or the first hash in the list. The order of the leaves is determined by the blockchain node who constructed the winning block. In Bitcoin SV, the order should reflect the topological order and the first-seen rule.

Figure 7:
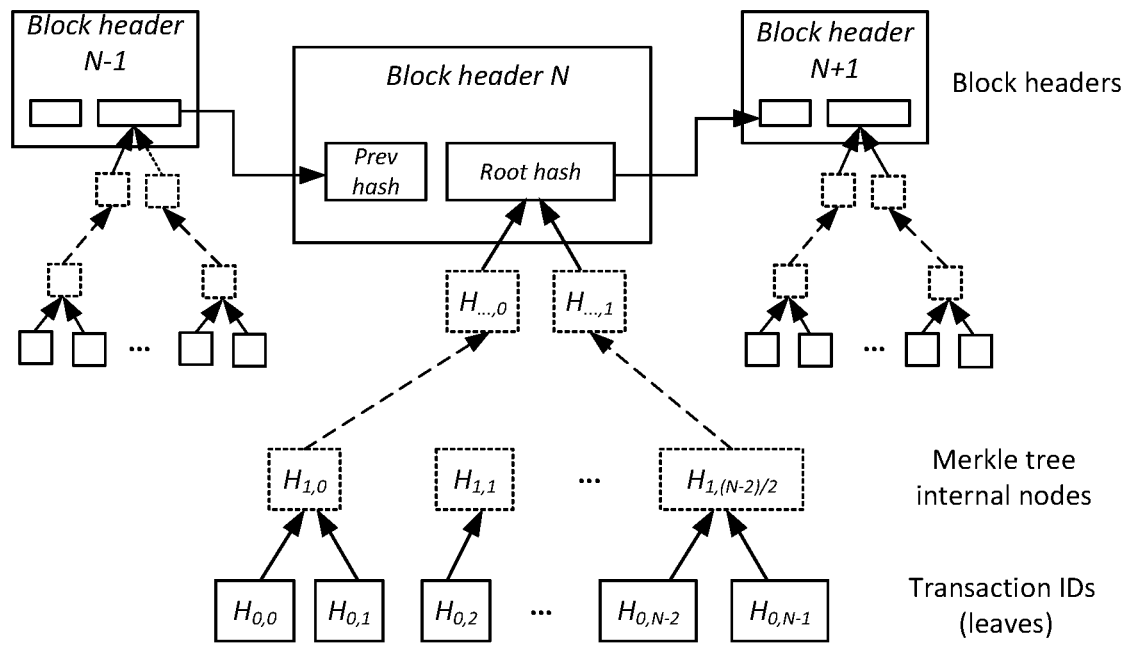

The third requirement provides an option for a trade-off between computation and storage. FIG. 7 illustrates the storage requirements, where solid line boxes are required (in some examples) and dashed line boxes are optional. Note that block headers contain additional fields to those shown but in general only the root hash is needed for Merkle proof. The previous hash may be used to index the root hash. The key point is that the general MPS 602 does not need to store the internal nodes.

The fourth requirement is to provide a proof of the depth of the Merkle Tree. This is an extra service that can be provided by the general MPS 602 to its users. Being presented with the raw data of a transaction, any verifier can be convinced that the first hash in its Merkle proof is indeed a leaf, because it is computationally infeasible to construct a meaningful transaction for a given hash value that is not a leaf. Moreover, since the length of the Merkle proof implies the depth of the Merkle tree, all Merkle proofs from the same tree have the same length. This service is particularly useful when users do not possess the raw data of the interested transaction.

Given a transaction ID, say $TxID_1$, the general MPS 602 goes through the ordered list of transaction IDs. If the general MPS 602 finds $TxID_1$, it constructs or extracts the Merkle proof for $TxID_1$ and outputs it. Otherwise, the general MPS 602 outputs e.g. "transaction not found". Given the raw data of a transaction, the general MPS 602 can hash the data to obtain the corresponding transaction ID and proceed as above.

When a new block is published, the general MPS 602 obtains the following:
1. the new block header,
2. the ordered list of transaction IDs for the new block, and
3. the raw coinbase transaction.

The general MPS 602 may optionally check that:
1. the new block header has valid proof of work,
2. the Merkle root calculated from the transaction IDs is equal to the Merkle root in the block header, and
3. the hash of the coinbase transaction equals the first element in the leaves.

Note—There is no requirement for the server to obtain raw transactions or run signature verifications on transactions.

The following describes why providing the depth of the Merkle tree is a valuable service. An SPV client takes a transaction ID and a Merkle proof as the input, and outputs true if the Merkle root matches that in one of the block headers and false otherwise. However, this verification does not check whether the length of the Merkle proof matches the length of the Merkle tree due to the lack of necessary information. In some cases, an adversary could submit a shortened Merkle proof in an attempt to prove that a non-existent transaction ID exists. This shortened Merkle proof can be obtained by removing the leaves or subsequent hashes altogether.

The general MPS 602 as a Merkle proof provider is in the best position to provide the required information to verify the length of a Merkle proof. Instead of providing the depth of a Merkle tree explicitly, general MPS 602 provides the raw data of the coinbase transaction and its Merkle proof. It is computationally infeasible to fake the raw transaction data and the Merkle proof. Therefore, it serves as a proof for the depth of the Merkle tree. Knowing the depth of the tree can mitigate the critical vulnerability that is mentioned above. Note that if the SPV is provided with the raw data of the interested transaction and the Merkle proof, then it is secure against this vulnerability. When the SPV does not have the raw data of the interested transaction, we can use the raw data of a coinbase transaction and its Merkle proof to establish the depth of the Merkle tree or the correct length of a Merkle proof with respect to this Merkle tree.

Theoretically, this vulnerability can also be used to fool the general MPS 602 into accepting a Merkle tree whose leaves or any subsequent levels are removed altogether. However, the general MPS 602 may connect to multiple blockchain nodes 104 to ensure the consistency and the correctness of the information received. Moreover, the general MPS 602 can also choose to download the raw data of the coinbase transaction to verify the depth of the Merkle tree for a new block.

From time to time the general MPS 602 may have to deal with competing blocks, reorganisations and orphan blocks, which happen when there is more than one block found for the same block height at the same time. Fortunately this situation does not happen except in the most recent headers and it happens rarely. The blockchain 150 would usually converge to one of the competing chains after one or two blocks. Therefore when the general MPS 602 receives more than one block 151 at the same height, it will keep all of them until the blockchain network converges to the chain with the most proof of work.

Limitations of TxID-only MPS The general MPS 602 as described has some limitations. Given an unpublished transaction, say $TxID_{payment}$, the general MPS 602 will not be able to verify that the outpoint referenced in the input exists. The reason is that an outpoint is the concatenation of a transaction ID and an index. The general MPS 602 is able to determine whether the transaction ID exists, but it has no information about the number of outputs that transaction has or whether the output is spendable or not. One way to overcome this is to provide the raw data of the transaction that is referenced in the $TxID_{payment}$ to the general MPS 602 as part of the input. An alternative way is for the general MPS 602 to store the raw data of unspent transactions. (Unspent transaction here refers to a transaction that has at least one unspent and spendable output.) Note that if the general MPS 602 stores only the transaction IDs and the corresponding indices, the general MPS 602 cannot verify or prove that the indices have not been tampered with. The general MPS 602 requires the full raw data in order to verify or prove the integrity of the indices.

Moreover, it will not be able to provide users searching for particular data elements inside the transaction such as locking scripts or flags. Thus, it will not be able to support users using Bloom Filters for example, since they would be filtering transactions based normally on locking scripts and public keys included in the transaction.

This leads to the need for an MPS that can offer information at a more granular level. We refer to this as integrity MPS 601. An integrity MPS 601 will store the raw data of some transactions. Note that a general MPS 602 can be used to prove the integrity of a published transaction if the full transaction is given by the user. An integrity MPS 601 can be used to prove the integrity of some data extracted from a published transaction by storing the full transactions that are of interest. It does not require users to present the full transaction.

Integrity MPS

Integrity MPS 601 stores the raw transactions for a set of transactions of interest and their corresponding Merkle proofs. For queries about transactions in this set, this server can provide the raw transaction and its Merkle proof as a proof of its integrity. It also allows searches for partial transactions or data elements in the transaction contents.

Transactions of interest can be determined based on the data application such as Weather SV, Tokenized, Metanet, or any other data protocols—or even data strings such as locking scripts, public keys, outpoints and so on. Hence, there may be an integrity-MPS solely for the Weather SV application that is configured to store transactions carrying Weather SV only.

The set of raw transactions that are of interest are passed on to the integrity MPS 601 and persists on the server if they are published. The integrity MPS 601 can be considered as a gateway or has access to the gateways for the application-specific transactions. When the blockchain system scales to terabyte blocks, this would be the most efficient way to maintain an integrity MPS 601. For other instances, such as a fully decentralised peer-to-peer data application, we must resort to the mechanism of downloading the full block of transactions and prune those that are not of interest or filter them as in bitcoin improvement proposal 37 (BIP37) using Bloom filter.

During Operation

Integrity MPS 601, maintaining raw transactions of interest and their Merkle Proof in a Merkle tree, carries out the following steps in some embodiments:
Step 1: obtain raw transactions that are of interest.
Step 2: hash the raw transactions to obtain the transaction ID.
Step 3: query general MPS 602 for its Merkle proof.
Step 4: if the transaction is not published in a block, wait 10 mins and try again.

The dependency on a general MPS 602 in step 3 can be replaced by a mechanism of downloading and pruning, although this would be less efficient. An unpublished transaction in step 4 can be dropped after a pre-defined time limit to avoid congestion. The limit can vary from application to application.

Example Use Case

WeatherSV (WSV) is an application that allows users to record weather data on the Bitcoin ledger. Each location is given a unique public key (i.e. unique locking script). It has the following features:
An activated location can start uploading WSV transactions almost every 1 hour, which contains weather measurements of that location at that time.
Each WSV transaction has one input and two outputs, see the table below.
The outputs consist of
A non-spendable output of 0 satoshi. It has OP_FALSE OP_RETURN followed by a concatenation of
a flag that is constant for all WSV transactions, $flag_{WSV}$,
and the weather reading of the location, Weather data
A spendable output that is sent to that unique public key address of the Location. The address is called a Channel. Each location has its own address.
The input spends the spendable output of the previous WSV transaction for that location
Note—This means that public keys are reused for each location

| Version | 1 | Locktime | 0 |
|---|---|---|---|
| In-count | 1 | Out-count | 2 |
| | Input list | | Output list |
| Outpoint | Unlocking script | Value | Locking script |
| | $<Sig_A><Pub_A>$ | 0 satoshi | OP_FALSE OP_RETURN |
| | | | $<flag_{WSV}$ \|\|Weather data$>$ |
| | | x satoshi | OP_DUP OP_HASH_160 |
| | | | $<H_{160}(Pub_A)>$ |
| | | | OP_EQUALVERIFY |
| | | | OP_CHECKSIG |

The above table shows an example of a WSV transaction for Channel A. The transaction $TxID_{WSV_A i+1}$ has an outpoint $TxID_{WSV_A i}||1$. It has a non-spendable output that contains an OP_RETURN followed by the concatenation of WSV application flag and the weather data for the location associated with Channel A.

As of now this application has 6240 channels and total broadcasts of $3.27 \times 10^7$ transactions. Over March 2020, the number of WSV transactions formed approximately 27% of the transactions on the BSV blockchain.

An integrity MPS 601 for WeatherSV could be designed to achieve the following:
When queried with a WSV transaction or partially extracted data from a WSV transaction, the integrity MPS 601 can provide the full data with an integrity proof.

Note that partially extracted data can be a data string in the OP_RETURN payload of a transaction, or a public address that represents a location, or just a transaction ID. Observing that WSV transactions for a single location is a chain of transactions, we can prune the Merkle proofs of the parent transactions. For example, if we have a chain of 10 transactions, $TX_1, TX_2, \ldots, TX_{10}$, we only have to keep the Merkle proof for $TX_{10}$. However, if the integrity MPS is asked to give the integrity proof for $TX_1$, then we have to give all the raw data for $TX_2, TX_3, \ldots, TX_{10}$ and the Merkle proof for $TX_{10}$. This is a trade-off between bandwidth and storage. To balance it, one can prune every other transaction in the chain. That is, we can prune the Merkle proof for $TX_1$, $TX_3, \ldots, TX_9$. This way, when queried with any transaction in the chain, the integrity MPS will provide two raw transactions and one Merkle proof in the worst case.

We identify the authenticity of a WSV transaction by checking that:
The outpoint (transaction input) is the spendable output of the previous WSV transaction.
Both the transaction input and the spendable output are for the same WSV wallet address.

Hence, an authentic transaction is one that can only be generated by the entity that knows the secret key to the public key of the locking script of that particular weather SV address.

For each Weather Address (i.e. Weather channel or locking script), the MPS 601 keeps:
The most recent mined transaction and its associated Merkle tree
Raw transactions data for all spent transactions associated with that address. There is no need to save the Merkle tree for the previously spent transactions in the case of WSV protocol.

Figure 9:
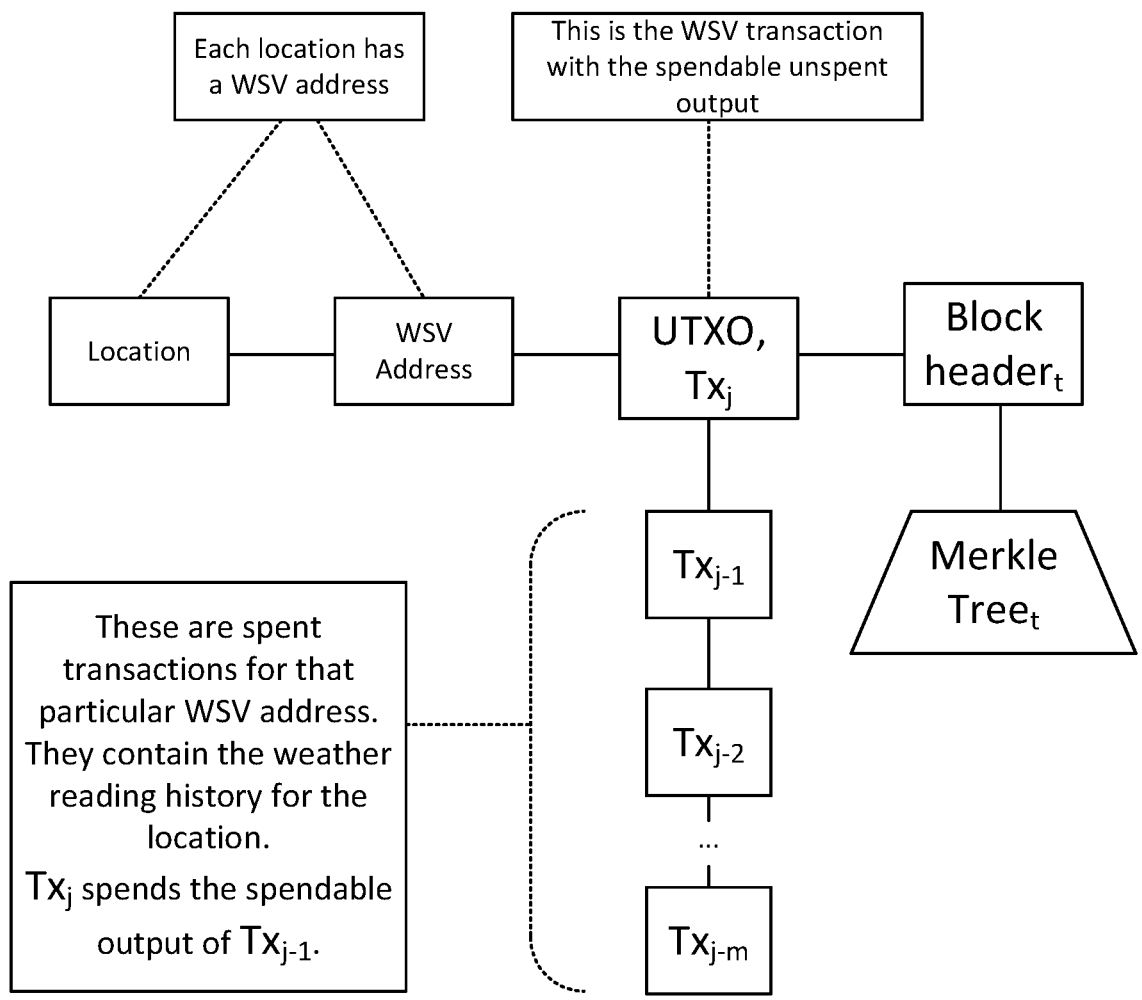
FIG. 9 illustrates the data mapped to each location in a Weather SV Merkle proof entity.

As shown in FIG. 9, an instance of an integrity MPS 601 for WSV transactions would store for each location:
its associated address, and for each address
the raw transaction $TxID_i$ with unspent spendable output $TxID_i \| 1$,
the block header associated with $TxID_i$, and
the Merkle Proof for that block header,
the raw parent transactions whose IDs are $TxID_{i-1}$, $TxID_{i-2}, \ldots, TxID_{i-r}$. The parent transactions do not need to have their Merkle proofs saved. Their raw data transaction format is kept, such that they can always be linked to the current $TxID_i$.

Storage Savings

For the current block sizes, rates, etc, we need the Merkle tree for each of at least the last 6 blocks that is roughly 128 Kbytes×6=768 Kb. The raw data transaction for each channel for 30 days is currently 300×30×24=0.2 Mb. For all 6240 channels, only 1.26 Gb of storage is needed. Whereas the blockchain for the last month only is 4.8 Gb, and the full blockchain is 200 Gb. In conclusion an integrity MPS 601 for WSV application would need to store only quarter of the blockchain over the same period.

When a data application generates a huge volume of transactions, it is possible to parallelise the process by having multiple integrity MPSs 601 partitioning those transactions. A partition based on block height could be a good solution. A query would then be sent to all the MPSs if the block height is unknown. The trade-off is between one lookup in a big dataset and a few lookups in a few much smaller datasets.

CONCLUSION

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In other embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.

Statement 1. A computer-implemented method of providing proof that a data item of a blockchain transaction exists on a blockchain, wherein the method is performed by a Merkle proof entity configured to store a set of transaction identifiers of respective blockchain transactions but not to publish new blockchain blocks to the blockchain network, and wherein the method comprises: obtaining, from a requesting party, target data item of a target blockchain transaction; obtaining the target blockchain transaction; obtaining a target Merkle proof for the target blockchain transaction, wherein a corresponding target Merkle root is contained within a block of the blockchain, and wherein obtaining the target Merkle proof comprises calculating an index of a target transaction identifier of the target blockchain transaction within a leaf layer of a corresponding target Merkle tree; and outputting at least the target Merkle proof for use by the requesting party as proof that the target data item exists as part of the target blockchain transaction on the blockchain.

Put another way, the method provides proof that a blockchain transaction comprising the target data item exists on the blockchain.

In some embodiments, multiple blockchain transactions may comprise the target data item. The Merkle proof entity may obtain those multiple target transactions, obtain a respective target Merkle proof for each of the multiple target transactions, and output at least the respective target Merkle proofs for use by the requesting party, e.g. to the requesting party. The Merkle proof entity may also output each of the multiple target blockchain transactions.

The Merkle root being contained within a block of the blockchain may comprise the Merkle root being contained within a block header of a block of the blockchain.

Statement 2. The method of statement 1, comprising outputting the index to the requesting party.

Statement 3. The method of statement 2, wherein the Merkle proof comprises the index.

Statement 4. The method of any preceding statement, wherein the Merkle proof entity does not store the full blockchain.

In other words, the set of blockchain transactions does not contain every transaction published on the blockchain.

Statement 5. The method of any preceding statement, comprising outputting the target blockchain transaction for use by the requesting party as proof that the target data item exists as part of the target blockchain transaction on the blockchain.

Statement 6. The method of any preceding statement, wherein the stored set of blockchain transactions are obtained from one or more blockchain nodes.

Statement 7. The method of statement 5, comprising:
obtaining a plurality of blockchain transactions from one or more blockchain nodes; and
pruning and/or filtering the plurality of blockchain nodes to obtain one or more of the stored set of blockchain transactions.

Statement 8. The method of any preceding statement, wherein one or more of the stored set of blockchain transactions are obtained from a service provider, and wherein the stored set of blockchain transactions relate to a service provided by the service provider.

Statement 9. The method of any preceding statement, wherein said obtaining of the target blockchain transaction comprises obtaining the target blockchain transaction from the stored set of blockchain transactions.

E.g. by searching for a blockchain transaction comprising the target data item.

Statement 10. The method of any preceding statement, wherein said obtaining of the target blockchain transaction comprises receiving the target blockchain transaction from the requesting party.

Statement 11. The method of any preceding statement, wherein said obtaining of the target Merkle proof comprises:
sending the target blockchain transaction or a target transaction identifier of the target blockchain transaction to a primary Merkle proof entity configured to store a set of transaction identifiers of respective blockchain transactions; and
receiving the target Merkle proof from the primary Merkle proof entity, wherein the target Merkle proof is based on one or more of the stored set of transaction identifiers.

Statement 12. The method of statement 11, wherein the target Merkle proof is obtained in advance of obtaining the target data item from the requesting entity.

Statement 13. The method of statement 11 or statement 12, comprising obtaining a respective Merkle proof for each of the stored set of blockchain transactions.

Statement 14. The method of any preceding statement, wherein said obtaining of the target Merkle proof comprises calculating the target Merkle proof.

Statement 15. The method of any preceding statement, wherein said outputting of the target Merkle proof comprises transmitting the target Merkle proof to the requesting party and/or publishing the target Merkle proof.

Statement 16. The method of statement 5 or any statement dependent thereon, wherein said outputting of the target blockchain transaction comprises transmitting the target blockchain transaction to the requesting party and/or publishing the target blockchain transaction.

Statement 17. The method of any preceding statement, wherein the stored set of blockchain transactions comprises a plurality of subsets of blockchain transactions, wherein each subset of blockchain transactions are from a respective block of the blockchain.

Each subset of transaction identifiers may be stored in an ordered list corresponding to an order of the blockchain transaction stored in the respective block.

Statement 18. The method of statement 17, wherein each subset of blockchain transactions is stored in association with a respective block header of the respective block the blockchain.

The respective block headers may be stored in an ordered list corresponding to the order of blocks published on the blockchain.

Statement 19. The method of any preceding statement, wherein the respective block headers are obtained from one or more blockchain nodes.

All of the block headers may be obtained from a single node. Alternatively, the block headers may be obtained from multiple nodes, e.g. some from one node, some from a different node, etc.

In some examples, the Merkle proof entity may verify some or all of the obtained block headers by obtaining the same block headers from multiple nodes.

Additionally or alternatively, some or all of the block headers may be obtained from one or more simplified payment verification (SPV) clients.

Statement 20. The method of statement 17 or any statement dependent thereon, wherein the Merkle proof entity stores, for each subset of blockchain transactions, a generation blockchain transaction from the respective block containing that subset of blockchain transactions.

Statement 21. The method of statement 20, comprising:
obtaining a Merkle proof for the generation blockchain transaction; and
outputting at least the Merkle proof for use by the requesting party for proving that a length of the target Merkle proof matches a length of the corresponding target Merkle tree.

Statement 22. The method of statement 21, wherein said outputting of the Merkle proof comprises outputting the generation blockchain transaction.

Statement 23. The method of any preceding statement, wherein the target data item comprises at least one of:
a transaction identifier of the target blockchain transaction,
an input of the target blockchain transaction,
an output of the target blockchain transaction,
a data field of an input of the target blockchain transaction, and/or
a data field of an output of the target blockchain transaction.

Statement 24. The method of statement 23, wherein the data field of the input and/or output of the target blockchain transaction comprises at least one of: a blockchain address, a public key, a protocol flag, a locking script, and/or media content.

Statement 25. The method of any preceding statement, wherein the stored set of blockchain transactions comprises a chain of blockchain transactions, and wherein the target blockchain is a most recent one of the chain of blockchain transactions.

Statement 26. The method of statement 25, comprising outputting each transaction in the chain of blockchain transactions for use by the requesting party as proof that each transaction in the chain of blockchain transactions exists on the blockchain.

Statement 27. The method of statement 25 or statement 26, comprising storing only the target Merkle proof and not the Merkle proof for any other transactions in the chain of blockchain transactions.

Statement 28. The method of any preceding statement, wherein the requesting party is an end user.

Statement 29. Computer equipment comprising:
memory comprising one or more memory units; and
processing apparatus comprising one or more processing units, wherein the memory stores code arranged to run on the processing apparatus, the code being configured so as when on the processing apparatus to perform the method of any preceding statement.

Statement 30. A computer program embodied on computer-readable storage and configured so as, when run on one or more processors, to perform the method of any preceding statement.

The invention claimed is:

1. A computer-implemented method of providing proof that a data item of a blockchain transaction exists on a blockchain, wherein the method is performed by a Merkle proof entity configured to store a set of transaction identifiers of respective blockchain transactions but not to publish new blockchain blocks to the blockchain, and wherein the method comprises:
   obtaining, by the Merkle proof entity from a requesting party, target data item of a target blockchain transaction;
   obtaining, by the Merkle proof entity, the target blockchain transaction;
   obtaining, by the Merkle proof entity, a target Merkle proof for the target blockchain transaction, wherein a corresponding target Merkle root is contained within a block of the blockchain, and wherein obtaining the target Merkle proof comprises calculating an index of a target transaction identifier of the target blockchain transaction within a leaf layer of a corresponding target Merkle tree; and
   outputting, by the Merkle proof entity, at least the target Merkle proof for use by the requesting party as proof that the target data item exists as part of the target blockchain transaction on the blockchain.

2. The method of claim 1, comprising outputting the index to the requesting party.

3. The method of claim 2, wherein the Merkle proof comprises the index.

4. The method of claim 1, wherein the Merkle proof entity does not store the full blockchain.

5. The method of claim 1, comprising outputting the target blockchain transaction for use by the requesting party as proof that the target data item exists as part of the target blockchain transaction on the blockchain.

6. The method of claim 1, wherein the stored set of blockchain transactions are obtained from one or more blockchain nodes.

7. The method of claim 5, comprising:
   obtaining a plurality of blockchain transactions from one or more blockchain nodes; and
   pruning and/or filtering the plurality of blockchain nodes to obtain one or more of the stored set of blockchain transactions.

8. The method of claim 1, wherein one or more of the stored set of blockchain transactions are obtained from a service provider, and wherein the stored set of blockchain transactions relate to a service provided by the service provider.

9. The method of claim 1, wherein said obtaining of the target blockchain transaction comprises obtaining the target blockchain transaction from the stored set of blockchain transactions.

10. The method of claim 1, wherein said obtaining of the target blockchain transaction comprises receiving the target blockchain transaction from the requesting party.

11. The method of claim 1, wherein said obtaining of the target Merkle proof comprises:
   sending the target blockchain transaction or a target transaction identifier of the target blockchain transaction to a primary Merkle proof entity configured to store a set of transaction identifiers of respective blockchain transactions; and
   receiving the target Merkle proof from the primary Merkle proof entity, wherein the target Merkle proof is based on one or more of the stored set of transaction identifiers.

12. The method of claim 11, wherein the target Merkle proof is obtained in advance of obtaining the target data item from the requesting entity.

13. The method of claim 11, comprising obtaining a respective Merkle proof for each of the stored set of blockchain transactions.

14. The method of claim 1, wherein the stored set of blockchain transactions comprises a plurality of subsets of blockchain transactions, wherein each subset of blockchain transactions are from a respective block of the blockchain.

15. The method of claim 14, wherein each subset of blockchain transactions is stored in association with a respective block header of the respective block the blockchain.

16. The method of claim 14, wherein the Merkle proof entity stores, for each subset of blockchain transactions, a generation blockchain transaction from the respective block containing that subset of blockchain transactions.

17. The method of claim 16, comprising:
   obtaining a Merkle proof for the generation blockchain transaction; and
   outputting at least the Merkle proof for use by the requesting party for proving that a length of the target Merkle proof matches a length of the corresponding target Merkle tree.

18. The method of claim 17, wherein said outputting of the Merkle proof comprises outputting the generation blockchain transaction.

19. Computer equipment, comprising:
   memory comprising one or more memory units; and
   processing apparatus comprising one or more processing units, wherein the memory stores code arranged to run on the processing apparatus, the code being configured so as when run on the processing apparatus, the processing apparatus performs a method of:
   obtaining, from a requesting party, target data item of a target blockchain transaction;
   obtaining the target blockchain transaction;
   obtaining a target Merkle proof for the target blockchain transaction, wherein a corresponding target Merkle root is contained within a block of the blockchain, and wherein obtaining the target Merkle proof comprises calculating an index of a target transaction identifier of the target blockchain transaction within a leaf layer of a corresponding target Merkle tree; and
   outputting at least the target Merkle proof for use by the requesting party as proof that the target data item exists as part of the target blockchain transaction on the blockchain.

20. A computer program product embodied on non-transitory computer-readable storage media and configured so as, when run on one or more processors, the one or more processors perform a method of:
   obtaining, from a requesting party, target data item of a target blockchain transaction;
   obtaining the target blockchain transaction;

obtaining a target Merkle proof for the target blockchain transaction, wherein a corresponding target Merkle root is contained within a block of the blockchain, and wherein obtaining the target Merkle proof comprises calculating an index of a target transaction identifier of the target blockchain transaction within a leaf layer of a corresponding target Merkle tree; and outputting at least the target Merkle proof for use by the requesting party as proof that the target data item exists as part of the target blockchain transaction on the blockchain.

\* \* \* \* \*